United States Patent [19]
Oshizawa et al.

[11] Patent Number: 5,928,307
[45] Date of Patent: Jul. 27, 1999

[54] METHOD AND APPARATUS FOR DETERMINING AN ALTERNATE ROUTE IN A VEHICLE NAVIGATION SYSTEM

[75] Inventors: Hidekazu Oshizawa, Cupertino, Calif.; Haruhisa Tamai, Saitama, Japan

[73] Assignee: Visteon Technologies, LLC, Dearborn, Mich.

[21] Appl. No.: 08/786,839

[22] Filed: Jan. 15, 1997

[51] Int. Cl.[6] .................................................. G06F 165/00
[52] U.S. Cl. .......................... 701/210; 701/201; 701/211; 340/995
[58] Field of Search ................................ 701/201, 202, 701/208, 209, 210, 211; 340/988, 990, 995

[56] References Cited

U.S. PATENT DOCUMENTS

| | | | |
|---|---|---|---|
| 3,845,289 | 10/1974 | French .................................. | 235/151.2 |
| 4,570,227 | 2/1986 | Tachi et al. .............................. | 364/444 |
| 4,608,656 | 8/1986 | Tanaka et al. ........................... | 364/449 |
| 4,611,293 | 9/1986 | Hatch et al. ............................. | 364/449 |
| 4,672,565 | 6/1987 | Kuno et al. .............................. | 364/571 |
| 4,673,878 | 6/1987 | Tsushima et al. ....................... | 324/226 |
| 4,734,863 | 3/1988 | Honey et al. ............................ | 364/449 |
| 4,737,218 | 4/1988 | Hasebe et al. ........................... | 364/449 |
| 4,751,512 | 6/1988 | Longaker ................................ | 342/357 |
| 4,782,447 | 11/1988 | Ueno et al. .............................. | 364/449 |
| 4,796,191 | 1/1989 | Honey et al. ............................ | 364/450 |
| 4,797,841 | 1/1989 | Hatch ................................. | 364/571.04 |
| 4,831,563 | 5/1989 | Ando et al. ........................ | 364/571.05 |
| 4,862,398 | 8/1989 | Shimizu et al. .................... | 364/571.05 |
| 4,914,605 | 4/1990 | Loughmiller, Jr. et al. ............ | 364/518 |
| 4,918,609 | 4/1990 | Yamawaki ............................... | 364/449 |
| 4,926,336 | 5/1990 | Yamada ................................... | 364/444 |
| 4,937,753 | 6/1990 | Yamada ................................... | 364/449 |
| 4,964,052 | 10/1990 | Ohe ......................................... | 364/449 |
| 4,970,652 | 11/1990 | Nagashima .............................. | 364/449 |
| 4,982,332 | 1/1991 | Saito et al. .............................. | 364/449 |
| 4,984,168 | 1/1991 | Neukrichner et al. .................. | 364/449 |
| 4,989,151 | 1/1991 | Nuimura .................................. | 364/449 |
| 4,992,947 | 2/1991 | Nimura et al. .......................... | 364/444 |
| 4,996,645 | 2/1991 | Schneyderberg Van DerZon .. | 364/449 |
| 4,999,783 | 3/1991 | Tenmoku et al. ....................... | 364/450 |
| 5,040,122 | 8/1991 | Neukirchner et al. ................. | 364/449 |
| 5,046,011 | 9/1991 | Kakihara et al. ........................ | 364/449 |
| 5,060,162 | 10/1991 | Ueyama et al. ......................... | 364/449 |
| 5,177,685 | 1/1993 | Davis et al. ............................. | 364/443 |
| 5,184,303 | 2/1993 | Link ........................................ | 701/210 |
| 5,243,528 | 9/1993 | Lefebvre ................................. | 701/211 |
| 5,283,743 | 2/1994 | Odagawa ................................ | 364/457 |
| 5,287,297 | 2/1994 | Ihara et al. .......................... | 364/571.02 |
| 5,291,412 | 3/1994 | Tamai et al. ............................ | 701/211 |
| 5,291,413 | 3/1994 | Tamai et al. ............................ | 701/210 |
| 5,297,050 | 3/1994 | Ichimura et al. ....................... | 364/444 |
| 5,311,434 | 5/1994 | Tamai ...................................... | 701/210 |
| 5,689,423 | 11/1997 | Sawada .................................. | 701/202 |
| 5,752,217 | 5/1998 | Ishizaki et al. ......................... | 701/201 |
| 5,787,383 | 7/1998 | Moroto et al. .......................... | 701/210 |

OTHER PUBLICATIONS

French, *MAP matching Origins Approaches and Applications,* Rober L. French & Associates, 3815 Lisbon St., Suite 201, Fort Worth, Texas 76107, USA, pp. 91–116. (Month and Year Are Not Available).

*Primary Examiner*—Tan Nguyen
*Attorney, Agent, or Firm*—Beyer & Weaver, LLP

[57] ABSTRACT

A method and apparatus for determining an alternate route from a new source location located on an original route to a subsequent location on the original route using a vehicle navigation system are described. A portion of the original route to be avoided by the alternate route is determined which begins at the new source location. The portion of the original route includes a plurality of segments each of which has an original parameter associated therewith. Selected ones of the original parameters are adjusted thereby resulting in a plurality of adjusted parameters. The alternate route is then determined based in part on the adjusted parameters.

16 Claims, 7 Drawing Sheets

| distance (miles) | S1 | S2 | S3 | S4 | S5 | S6 | S7 | S8 | S9 | S10 | S11 or more |
|---|---|---|---|---|---|---|---|---|---|---|---|
| cost (seconds) | 100 | 90 | 80 | 70 | 60 | 50 | 40 | 30 | 20 | 10 | 0 |

METHOD AND APPARATUS FOR DETERMINING AN ALTERNATE ROUTE IN A VEHICLE NAVIGATION SYSTEM

BACKGROUND OF THE INVENTION

The present invention relates to route determination in a vehicle navigation system. More specifically, the present invention determination of alternate routes, i.e., detours, when road conditions make an originally determined route undesirable or impassable.

Because updating map databases with up-to-the-minute information regarding road conditions is an exceedingly challenging task (even for so-called intelligent vehicle/highway systems), currently available vehicle navigation systems often determine routes on which the user may encounter unforeseen or unforeseeable obstacles such as, for example, road construction or excessive traffic. In such situations it is desirable for the navigation system to have the capability to determine an alternate route "on the fly" to avoid the obstacle.

Some systems rely on user input to the route determination algorithms to determine routes which are most likely to be the easiest and fastest, i.e., the optimum route. By prospectively selecting appropriate route determination criteria, the user can use her knowledge of actual road conditions to facilitate determination of the best available route. For example, the user may specify that the system make maximum use of freeways, or, alternatively, that no freeways be used at all. The user may also specify that the route have a minimum number of turns, or that it be the shortest distance between the source and the destination. In addition, the user may specify that the route avoid all known obstacles such as, for example, toll booths. Unfortunately, while this approach provides some flexibility, it cannot anticipate and correct for road obstacles for which the user has little or no warning.

Figure 1:
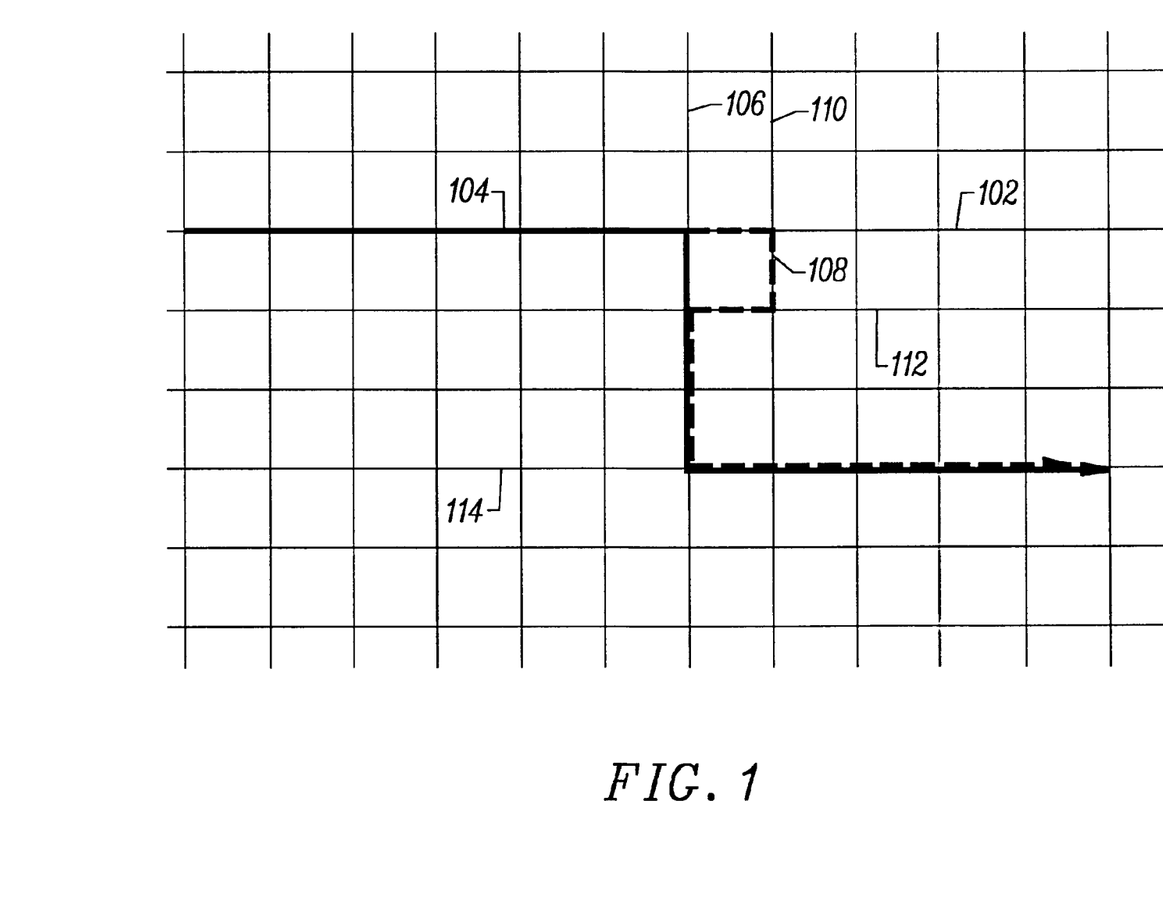
FIG. 1 illustrates one approach for generating an alternate route.

One approach to "on the fly" obstacle avoidance allows the user to tell the system to prohibit an upcoming maneuver in response to which the system determines a short detour from the point of the prohibited maneuver back to some subsequent point on the original route. This may be understood with reference to FIG. 1. As the user is proceeding east on road 102 along original route 104, she notices that road 106 is closed to the right because of construction. As a result, the right turn maneuver suggested by the system has become impossible. By refusing the indicated maneuver with the user interface, the user alerts the system to the obstacle. The system then determines an alternate route 108 based on the assumption that the right turn maneuver from road 102 to road 106 is not allowed. This results in the detour via roads 110 and 112 which leads back to road 106 as soon as possible.

Figure 2:
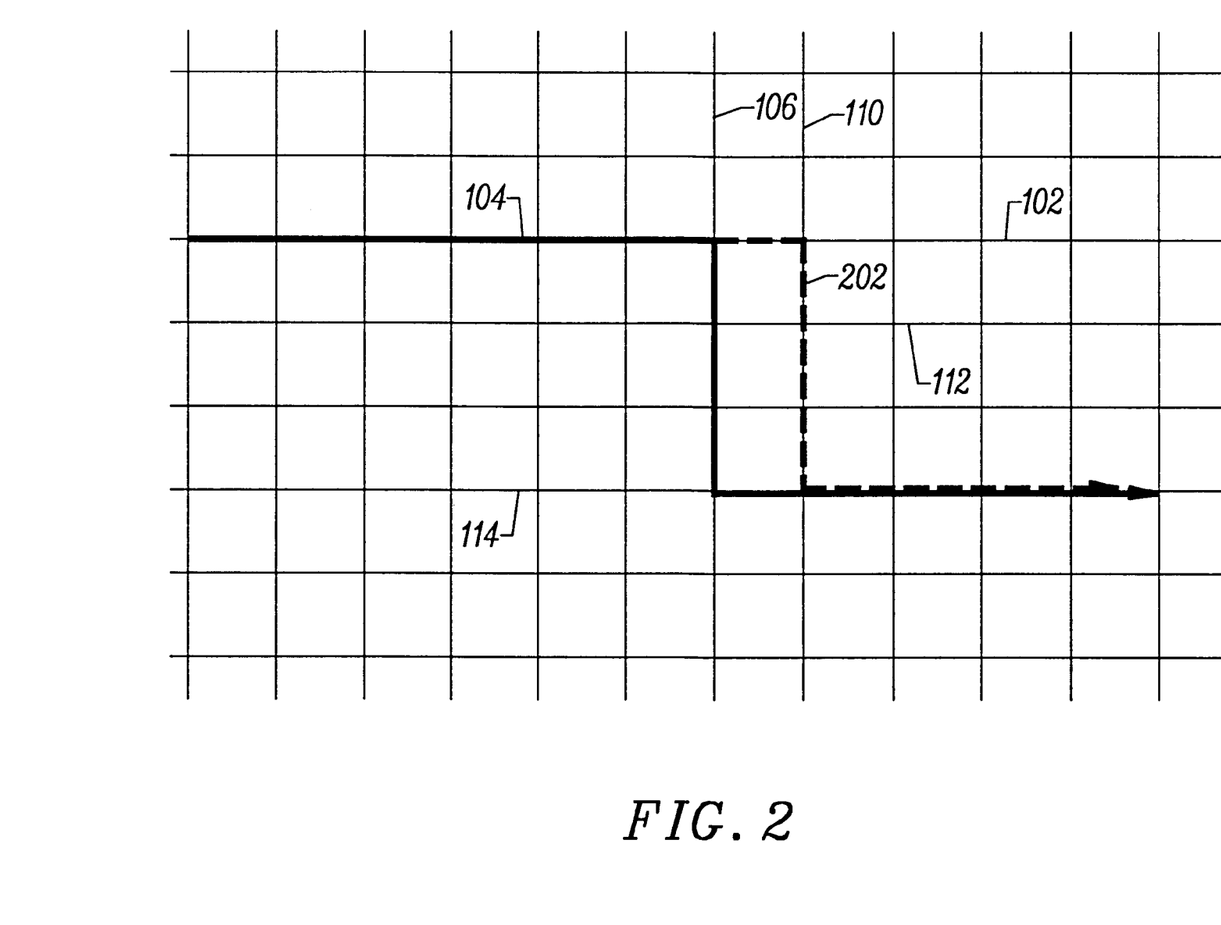
FIG. 2 illustrates another approach for generating an alternate route.

Unfortunately, the above-described approach is problematic where, for example, the entire portion of road 106 between roads 102 and 114 is closed. Such a situation is addressed by another approach which will be described with reference to FIG. 2. As in the previous example, the user alerts the system to the fact that the right turn maneuver onto road 106 is not possible. However, according to this approach, the system avoids the portion of road 106 between the two successive maneuvers at the intersection of roads 102 and 106 (i.e., the right turn mentioned above), and the intersection of roads 106 and 114 (a left turn). By ignoring the road segments between the next two upcoming maneuvers, an alternate route 202 is determined which avoids the problem discussed above.

However, despite the apparent advantages offered by each of these approaches, none allows the user to contribute input as to the nature of the alternate route based on her perception of the road conditions. Thus, none of the above-described approaches is sufficient to adapt to the high degree of variability of road conditions which may be encountered by the user. A more flexible approach to "on the fly" determination of alternate routes is therefore desirable.

SUMMARY OF THE INVENTION

The present invention provides a method and apparatus for "on the fly" determination of alternate routes in a vehicle navigation system which allows the user to specify the portion of the original route to be avoided by the alternate route. This enables the navigation system to generate alternate routes which bear some relation to the actual road conditions encountered by the user. That is, based on her perception of the road conditions, the user may specify a distance along the original route from the current vehicle position which is to be avoided by the alternate route. The system then adjusts one or more parameters associated with each of the segments in the original route within the specified distance such that when the alternate route is generated, these segments will tend to be avoided.

According to one embodiment, the system increases the cost associated with each segment in the portion of the original route specified by the user. The amount by which each cost value is increased varies according to its distance from the vehicles current location, i.e., the starting point of the alternate route. That is, the closer a segment is to the current vehicle position, the greater is its cost increment. In this way, the alternate route determination algorithm tends to completely avoid the original route segments immediately following the starting point of the alternate route with this avoidance tendency lessening somewhat as the algorithm encounters segments which are farther along the original route.

Thus, according to the invention, a method and apparatus are described for determining an alternate route from a new source location located on an original route to a subsequent location on the original route using a vehicle navigation system. A portion of the original route to be avoided by the alternate route is determined beginning at the new source location. The portion of the original route includes a plurality of segments each of which has an original parameter associated therewith. Selected ones of the original parameters are adjusted thereby resulting in a plurality of adjusted parameters. The alternate route is then determined based in part on the adjusted parameters.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRATION METHOD FOR A RELATIVE HEADING SENSOR, U.S. Pat. No. 5,359,529 to Snider for ROUTE GUIDANCE ON/OFF-ROUTE STATE FILTER, U.S. Pat. No. 5,374,933 to Kao for POSITION CORRECTION METHOD FOR VEHICLE NAVIGATION SYSTEM, and U.S. Pat. No. 5,515,283 to Desai et al. for METHOD FOR IDENTIFYING HIGHWAY ACCESS RAMPS FOR ROUTE CALCULATION IN A VEHICLE NAVIGATION SYSTEM, the entire specifications of which are incorporated herein by reference.

Figure 3:
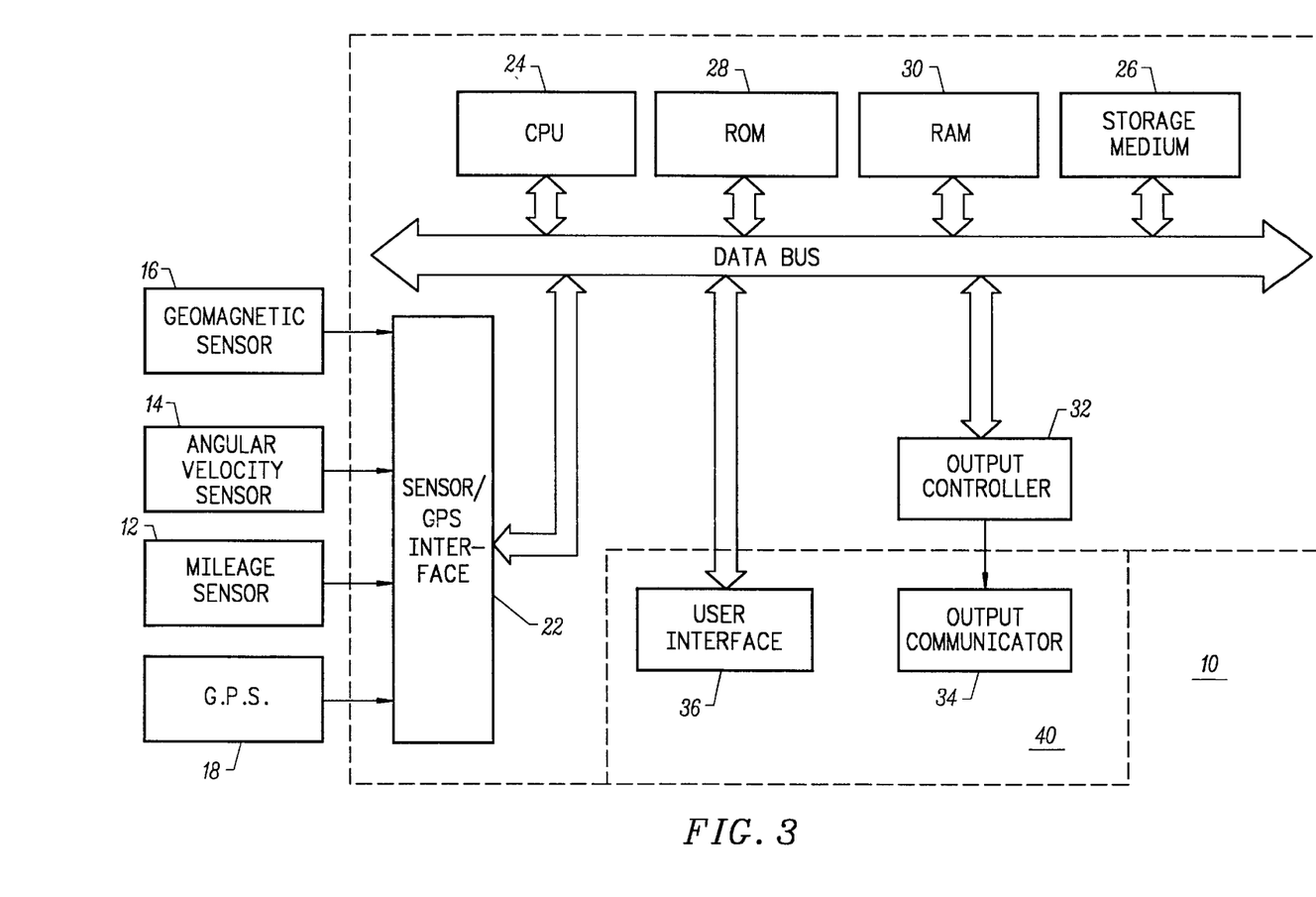
FIG. 3 is a block diagram of a specific embodiment of a vehicle navigation system for use with the present invention.

FIG. 3 is a block diagram of a specific embodiment of a vehicle navigation system 10 for use with the present invention. Sensors 12 and 14 and GPS receiver 18 are coupled to computing means 20 through sensor/GPS interface 22. In typical embodiments, mileage sensor 12 comprises an odometer, and angular velocity sensor 14 comprises a gyroscope, or a differential odometer coupled to the wheels of the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A database containing map information may be stored in database medium 26, with software directing the operation of computing means 20 stored in main memory 28 for execution by CPU 24. Memory 28 may comprise read-only memory (ROM), or reprogrammable non-volatile memory such as flash memory or SRAM. System RAM 30 permits reading and writing of the information necessary to execute such software programs. Database medium 26 may comprise non-volatile memory, a hard disk drive, CD-ROM, or an integrated circuit in which digitized map information has been stored. Output controller 32, which may comprise a graphics controller, receives data processed by CPU 24 and transmits the data to display console 40 which includes output communicator 34, usually comprising a display screen with associated audio electronics and audio speakers. The driver may input data, such as a desired destination, through user interface 36, typically comprising a keyboard.

The map database stored in database medium 26 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a link class which relates to the category or type of the road. For example, the highest level category of the hierarchy is the link class FREEWAY. The lowest level includes the link classes FRONTAGE and MISC which include, for example, frontage roads and alleys.

The vehicle navigation system of the present invention is operable to generate a route from a source location to a destination according to a variety of different methods. Some examples of such methods are described in the U.S. patents which are incorporated by reference into the present specification above. In addition, further methods for route generation which may be employed in conjunction with the present invention are described in commonly assigned, copending U.S. patent application Ser. No. 08/784,204 for ROUTE GENERATION IN A VEHICLE NAVIGATION SYSTEM, filed on Jan. 15, 1997, the entire specification of which is also incorporated herein by reference.

Figure 4A:
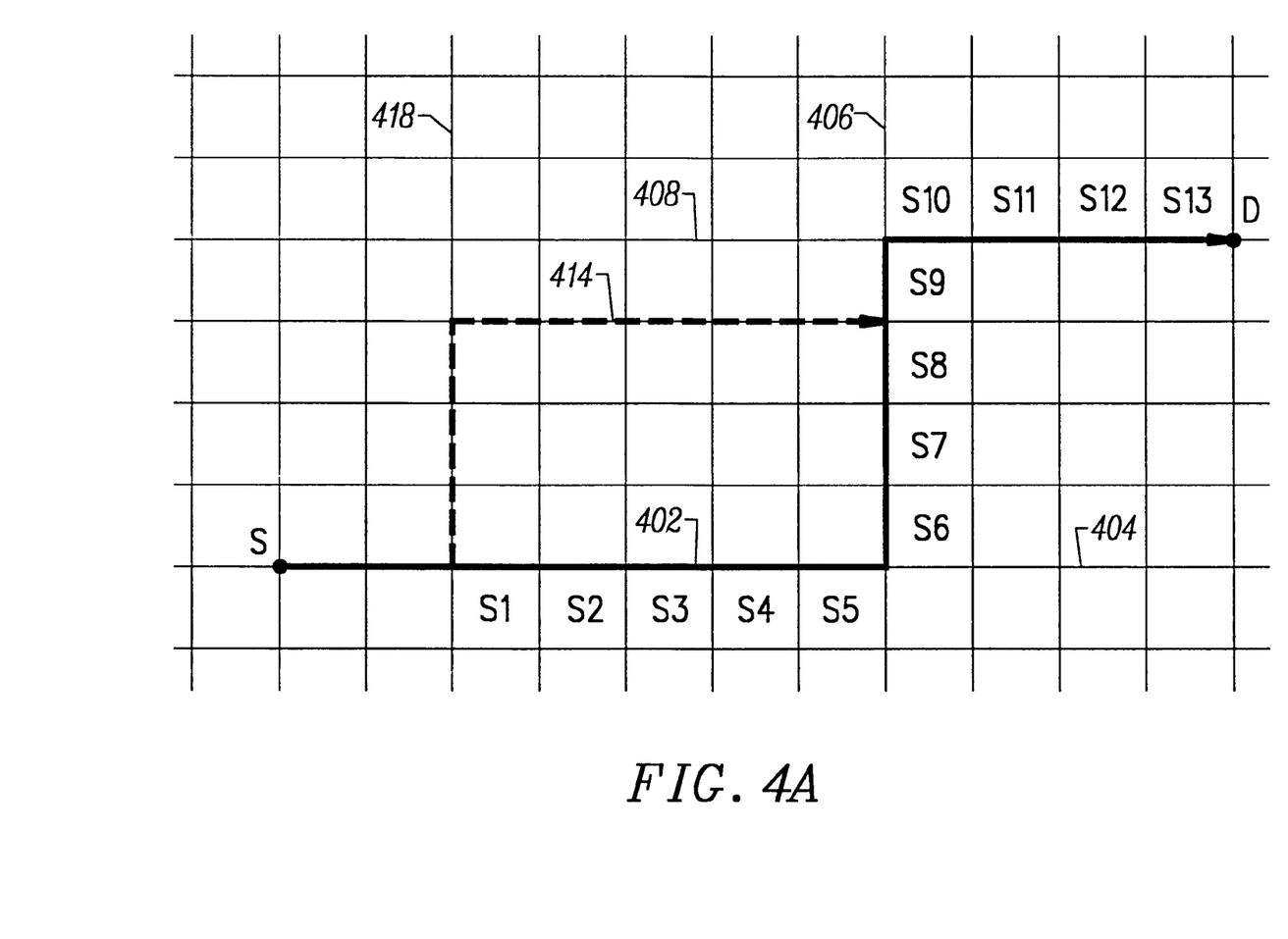
FIGS. 4A and 4B illustrate a specific embodiment of the present invention.
Figure 4B:
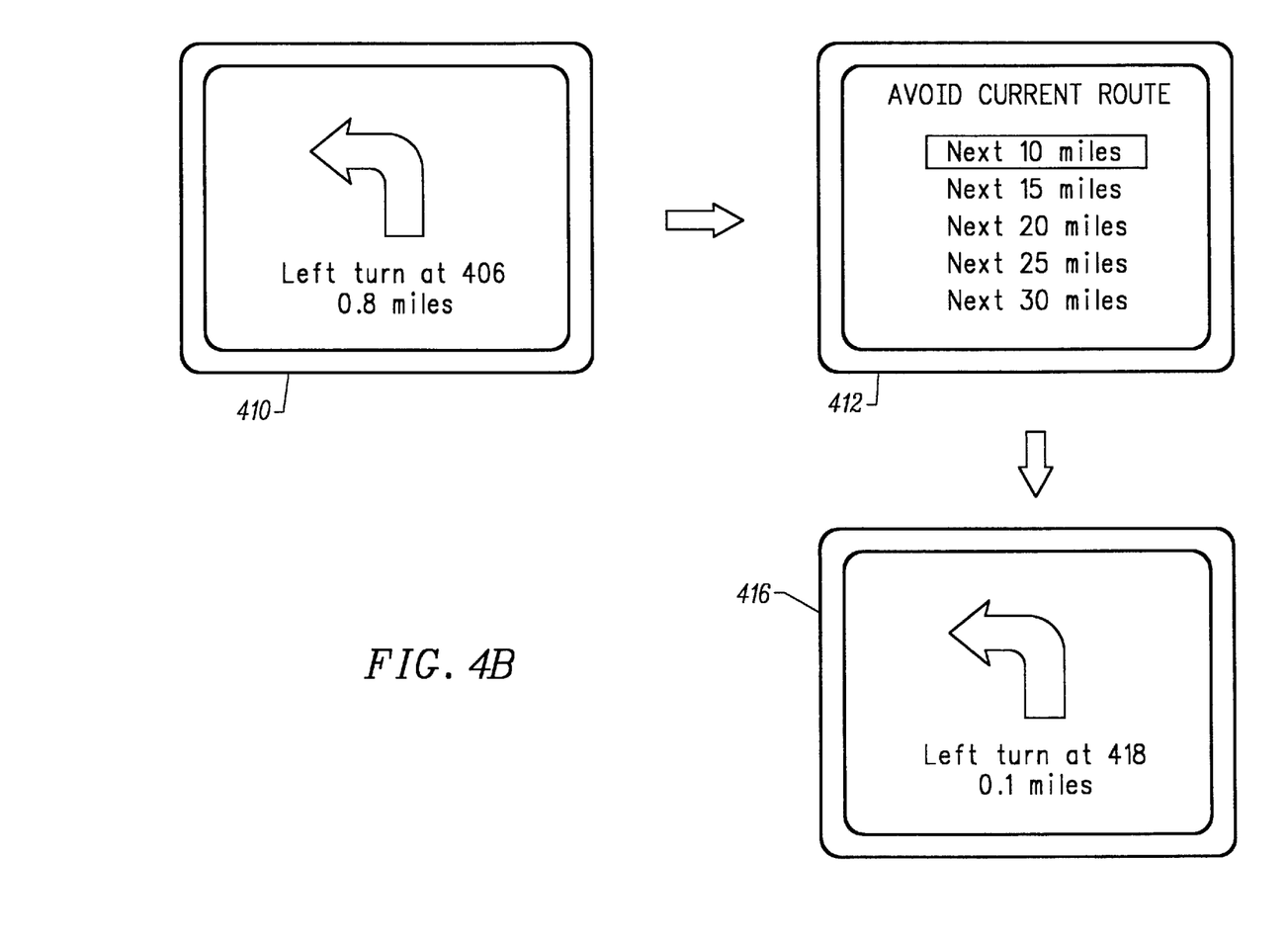

FIGS. 4A and 4B will serve to illustrate the operation of a specific embodiment of the invention. Initially, an original route 402 (along roads 404, 406, and 408) is generated by the vehicle navigation system as described above. As the user proceeds from source S along road 404, she encounters excessive traffic (or any of a variety of road obstacles) and activates a key or a switch on the user interface which informs the system that she wishes to avoid a portion of original route 402. The display screen progression is shown in FIG. 4B. As the user is proceeding along road 404, the next upcoming maneuver, i.e., left turn on road 406, is shown on display screen 410. When the user hits the "avoid" key, she is presented with the AVOID CURRENT ROUTE screen 412 in which she may scroll to a desired distance and hit "enter". The distances may be in miles as shown. Alternatively, the distances may be presented to the user as a number of road segments, city blocks, etc. According to another embodiment, the user may directly input any desired distance within a range.

Upon the user's selection of the distance, the system generates an alternate route 414 and communicates a new upcoming maneuver to the user (screen 416). In generating alternate route 414 the system increases the cost associated with selected ones of the segments in the portion of original route beginning at the intersection of roads 404 and 418 and extending the selected distance. The manner in which this is accomplished according to a specific embodiment may be understood with reference to FIG. 4A and table 500 in FIG. 5. As shown in FIG. 4A, original route 402 includes segments S1–S13. In generating an alternate route, the cost associated with each of these segments is increased by an amount shown in table 500. The cost values in table 500 are measured in seconds, but it will be understood that such costs may be represented in a number of ways.

Figure 5:
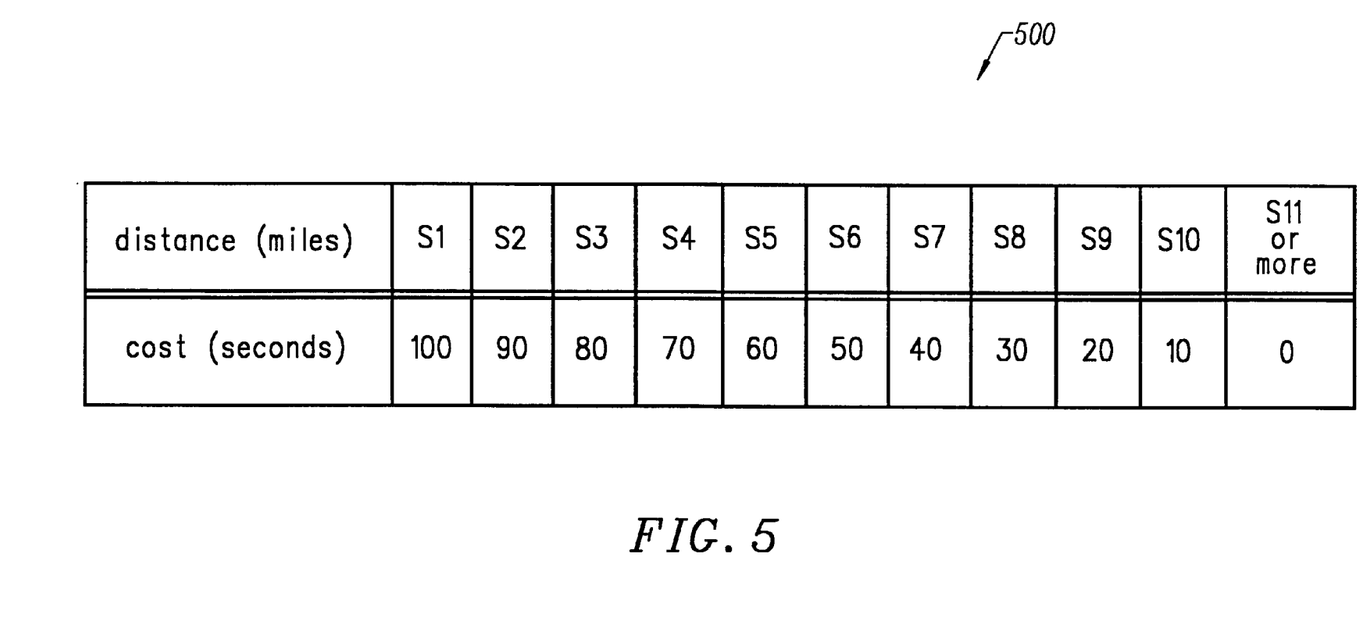
FIG. 5 is a table of cost values corresponding to a specific embodiment of the present invention.

As shown in the table, as the segment numbers increase, i.e., as the distance from the road obstacle increases, the cost added to the segment cost associated with each successive segment is gradually decreased to zero. The decrement and rate of this decrease depends upon the distance of the original route to be avoided as specified by the user. Thus, the closer the segment is to the road obstacle, the more likely that the alternate route generation algorithm will ignore it because of the dramatic increase in cost. Similarly, as the segments recede from the road obstacle, the likelihood that the algorithm will ignore them decreases until the alternate route includes a segment from the original route, i.e., segment S9.

It will be understood that the above-described embodiment of the invention may be modified to include the manipulation of node costs in place of, or in addition to, the manipulation of segment costs. Node costs are the costs associated with traversing a map node such as, for example, an intersection. The node cost for a particular intersection may be determined without regard to a particular route. It may also be determined to specifically reflect the traversal of the intersection from one specific segment to another. According to such an embodiment, node costs may be manipulated in much the same way as shown in FIG. 5 with regard to segment costs. The manipulated node costs may then be used to determine the alternate route either in place of the segments costs, or in addition to them.

Figure 6:
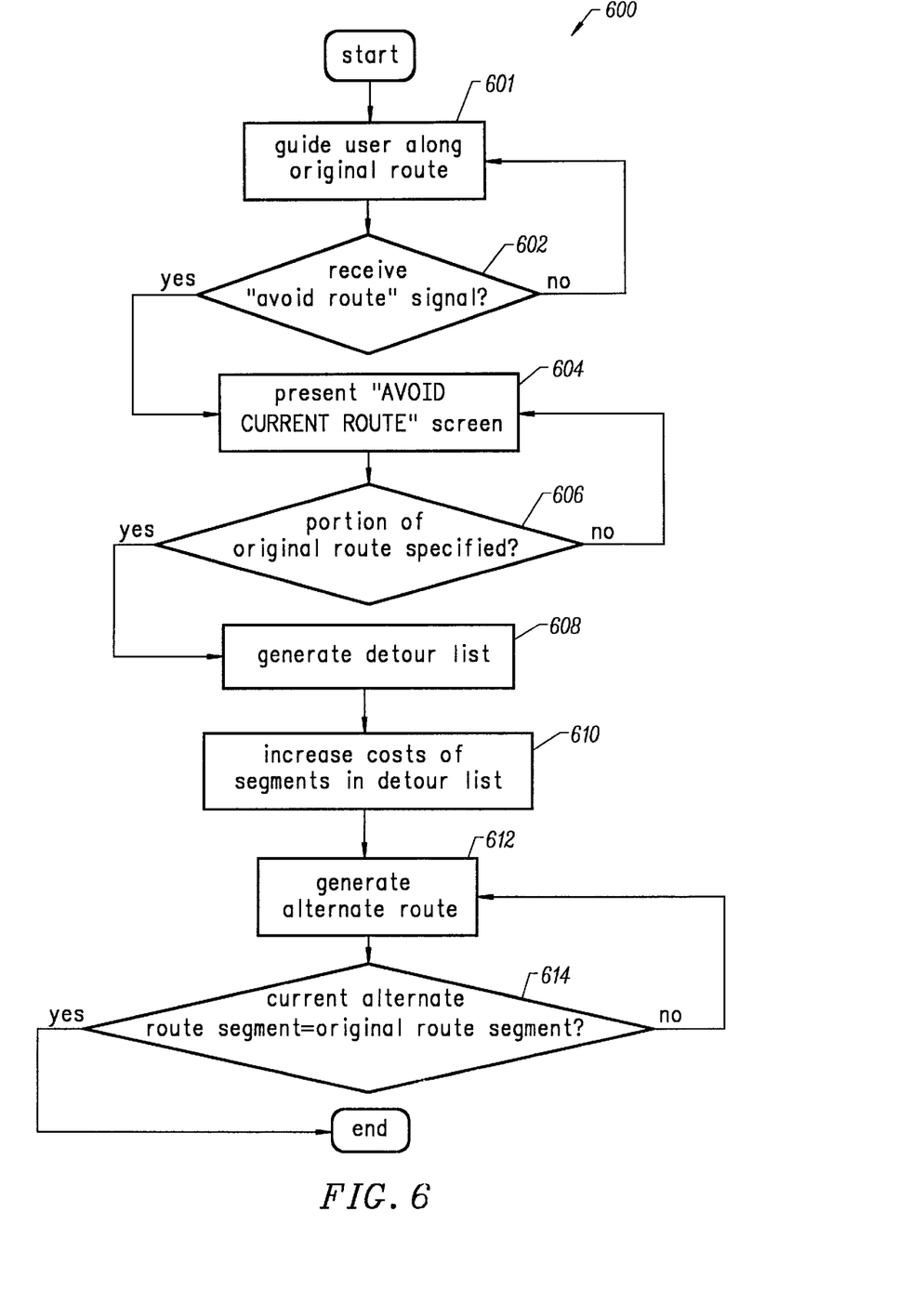
FIG. 6 is a flowchart illustrating a specific embodiment of the invention.

FIG. 6 is a flowchart 600 which illustrates the operation of a specific embodiment of the invention. The vehicle navigation system of the present invention guides the user along an originally calculated route (step 601) unless it receives an "avoid route" signal in response to input from the user (step 602). The system then presents the user with an "AVOID CURRENT ROUTE" screen as shown in FIG. 4B (step 604) so that the user may specify how much of the original route to avoid. Upon selection by the user of a portion of the current route to be avoided (step 606), the system generates a detour list which includes segments of the original route beginning with the vehicle's current location and ending at the distance specified by the user (step 608). For selected segments in the list, the system then increases the costs associated with each (step 610).

As discussed above with reference to FIGS. 4A and 5, the cost increment decreases as the distance between the original road segments and the road obstacle increases. Once the costs associated with the original road segments have been increased in this manner, the system generates an alternate route from the vehicle's current location, i.e., the location of the road obstacle, to some subsequent location on the original route (step 612). As discussed above, because of the increased costs associated with the original route segments in the detour list, the system tends to avoid expansion along these segments with the alternate route determination algorithm. This is especially true for the original route segments closest to the beginning of the alternate route because the greatest cost increase is associated with these segments. However, the further the original route segments in the detour list are from the current vehicle location, the less likely they are to be avoided by the search algorithm. In this way, the alternate route determination algorithm eventually includes a segment in the alternate route which coincides with a segment in the original route. Once this occurs, the algorithm terminates (step 614).

While the invention has been particularly shown and described with reference to specific embodiments thereof, it will be understood by those skilled in the art that the foregoing and other changes in the form and details may be made therein without departing from the spirit or scope of the invention. For example, the invention has been described with reference to a variable increment which is added to the segment costs associated with the road segments in a specified portion of the original route. It will be understood, however, that these costs may be manipulated in a variety of ways and remain within the scope of the invention. For example, in contrast to table 500, the cost increment need not be uniformly decremented for each successive segment in the original route. Rather, the cost increment may be fixed for several successive segments.

Moreover, for selected segments in the original route, rather than increasing the associated segments costs, access to such segments (e.g., the first five segments after the road obstacle) may be completely prohibited. Fixed and/or variable cost increments may then be added to successive segments. Thus, a variety of segment parameters (e.g., segment cost) may be manipulated in a variety of ways for the segments in the portion of the original route to be avoided by the alternate route. In view of the foregoing, the scope of the invention should therefore be determined by reference to the appended claims.

What is claimed is:

1. A method for determining an alternate route from a new source location located on an original route to a subsequent location on the original route using a vehicle navigation system, the method comprising the steps of:

determining a portion of the original route to be avoided by the alternate route, the portion of the original route beginning at the new source location, the portion of the original route comprising a plurality of segments each of which has an original parameter associated therewith;

adjusting selected ones of the original parameters thereby resulting in a plurality of adjusted parameters; and determining the alternate route from the new source location to the subsequent location based in part on the adjusted parameters.

2. The method of claim 1 wherein the first determining step comprises the steps of:

providing an input device to a user of the vehicle navigation system for selecting a length of the portion of the original route to be avoided by the alternate route; and determining the portion of the original route in response to input from the user.

3. The method of claim 2 wherein the input device provides a plurality of length options from which the user makes a selection.

4. The method of claim 2 wherein the input device allows the user to specify the length.

5. The method of claim 1 wherein the parameters comprise segment costs, the adjusting step comprising adding an additional cost to selected ones of the segment costs.

6. The method of claim 5 wherein the additional cost is fixed.

7. The method of claim 5 wherein the additional cost varies with the distance between the new source location and a particular segment.

8. The method of claim 7 wherein the additional cost decreases as the distance between the new source location and the particular segment increases.

9. The method of claim 1 wherein the parameters relate to segment access, the adjusting step comprising prohibiting access to selected ones of the segments for determination of the alternate route.

10. The method of claim 1 wherein the parameters comprise node costs, the adjusting step comprising adding an additional cost to selected ones of the node costs.

11. The method of claim 10 wherein the additional cost is fixed.

12. The method of claim 10 wherein the additional cost varies with the distance between the new source location and a particular node.

13. The method of claim 12 wherein the additional cost decreases as the distance between the new source location and the particular node increases.

14. An apparatus for determining an alternate route from a new source location located on an original route to a subsequent location on the original route, comprising:

means for determining a portion of the original route to be avoided by the alternate route, the portion of the original route beginning at the new source location, the portion of the original route comprising a plurality of segments each of which has an original parameter associated therewith;

means for adjusting selected ones of the original parameters thereby resulting in a plurality of adjusted parameters; and means for determining the alternate route from the new source location to the subsequent location based in part on the adjusted parameters.

15. A vehicle navigation system, comprising:

a plurality of sensors for detecting a current vehicle position and a vehicle heading, and generating signals indicative thereof;

a database medium having geographic locations of a plurality of road segments and segment nodes stored therein;

a processor coupled to the sensors and the database medium for generating an alternate route from a new source location located on an original route to a subsequent location on the original route, the processor being operable to:

(a) determine a portion of the original route to be avoided by the alternate route, the portion of the original route beginning at the new source location, the portion of the original route comprising a plurality of segments each of which has an original parameter associated therewith;

(b) adjust selected ones of the original parameters thereby resulting in a plurality of adjusted parameters; and (c) determine the alternate route from the new source location to the subsequent location based in part on the adjusted parameters; and an output communicator coupled to the processor for communicating the alternate route to a user of the vehicle navigation system.

16. A computer program product for determining an alternate route from a new source location located on an original route to a subsequent location on the original route, comprising:

a computer-readable medium; and a computer program mechanism embedded in the computer-readable medium for causing a computer to perform the steps of:

determining a portion of the original route to be avoided by the alternate route, the portion of the original route beginning at the new source location, the portion of the original route comprising a plurality of segments each of which has an original parameter associated therewith;

adjusting selected ones of the original parameters thereby resulting in a plurality of adjusted parameters; and determining the alternate route from the new source location to the subsequent location based in part on the adjusted parameters.

* * * * *